May 16, 1939. F. (FELIX) GOFFAUX 2,158,900
MACHINE FOR CUTTING SHEET GLASS
Filed Dec. 31, 1937 4 Sheets-Sheet 1
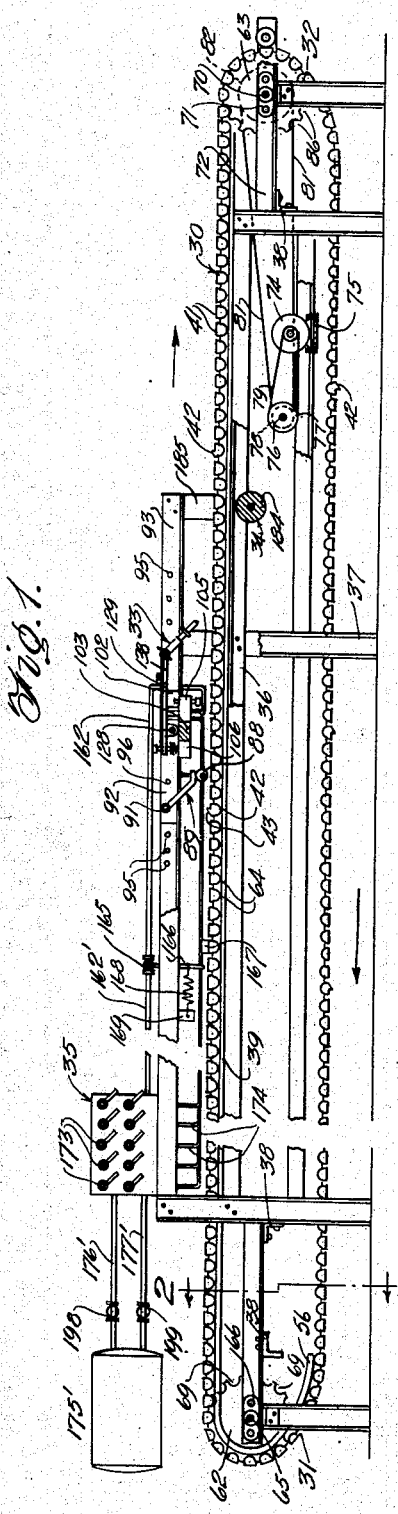
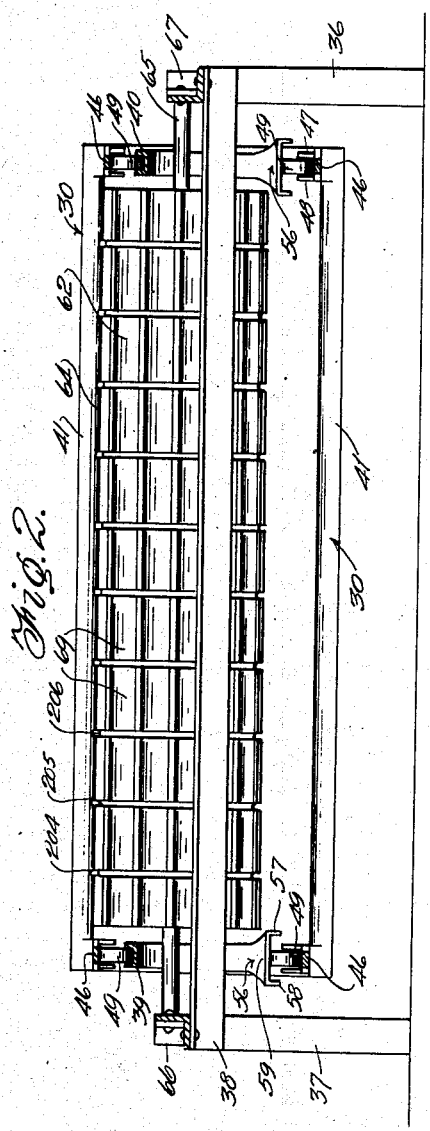
Inventor
LYDIA DIERICK GOFFAUX, ADMINISTRATRIX OF
THE ESTATE OF FELICIEN (FELIX) GOFFAUX,
DECEASED.
By Kimmel & Crowell
Attorneys.

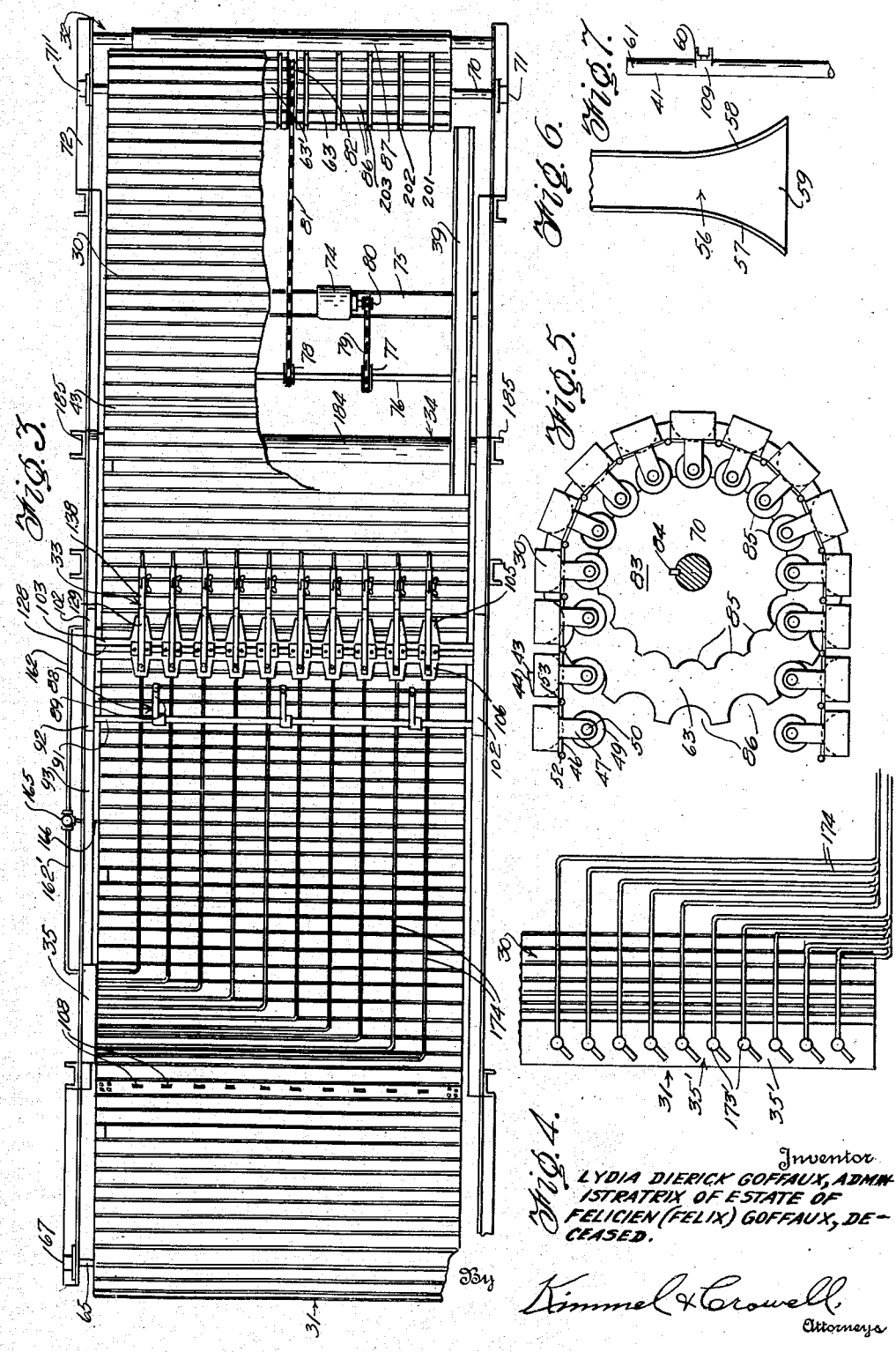

May 16, 1939.　　F. (FELIX) GOFFAUX　　2,158,900
MACHINE FOR CUTTING SHEET GLASS
Filed Dec. 31, 1937　　4 Sheets-Sheet 3
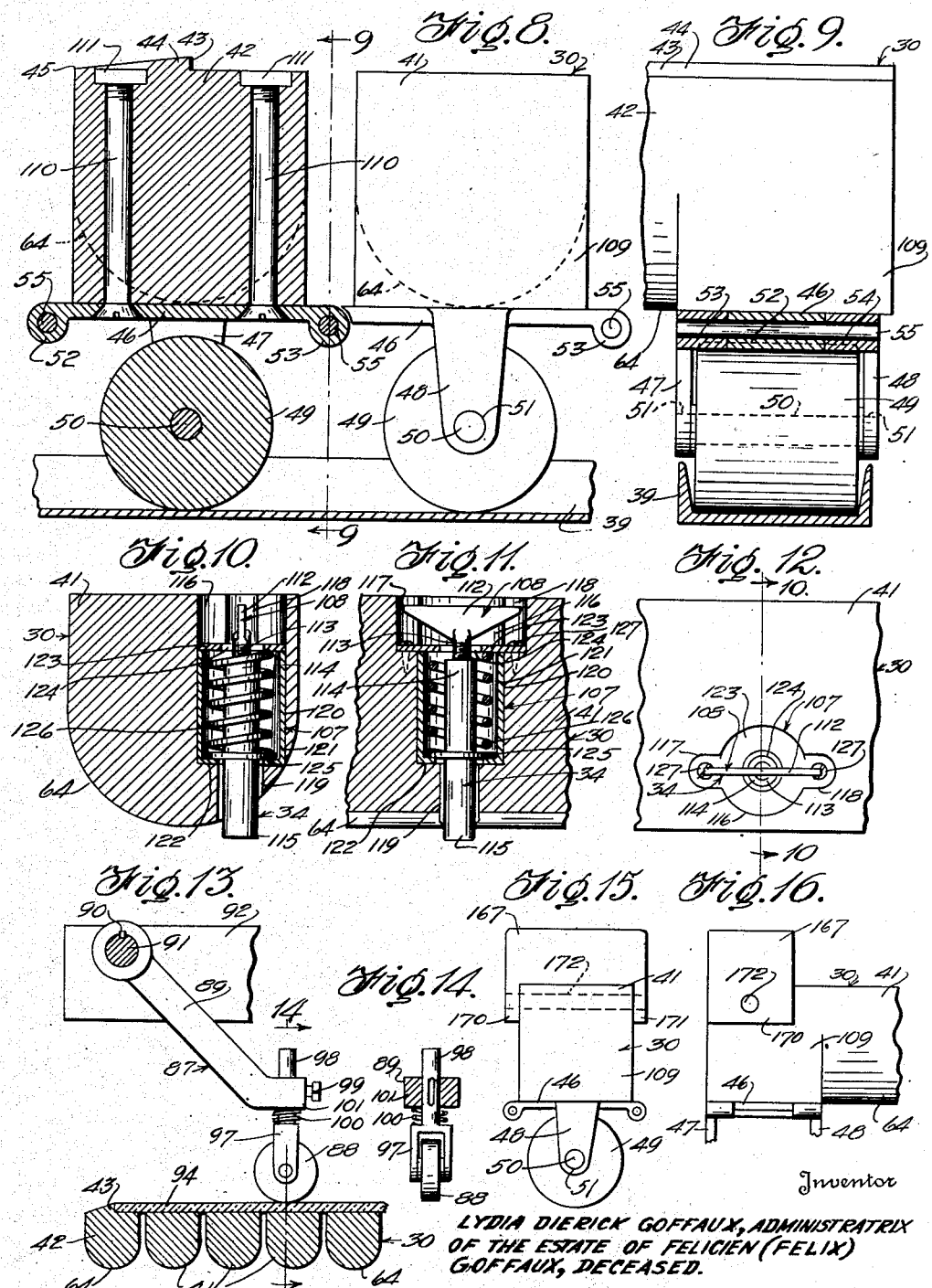
Inventor
LYDIA DIERICK GOFFAUX, ADMINISTRATRIX
OF THE ESTATE OF FELICIEN (FELIX)
GOFFAUX, DECEASED.
By Kimmel & Crowell
Attorneys May 16, 1939.　　F. (FELIX) GOFFAUX　　2,158,900
MACHINE FOR CUTTING SHEET GLASS
Filed Dec. 31, 1937　　4 Sheets-Sheet 4
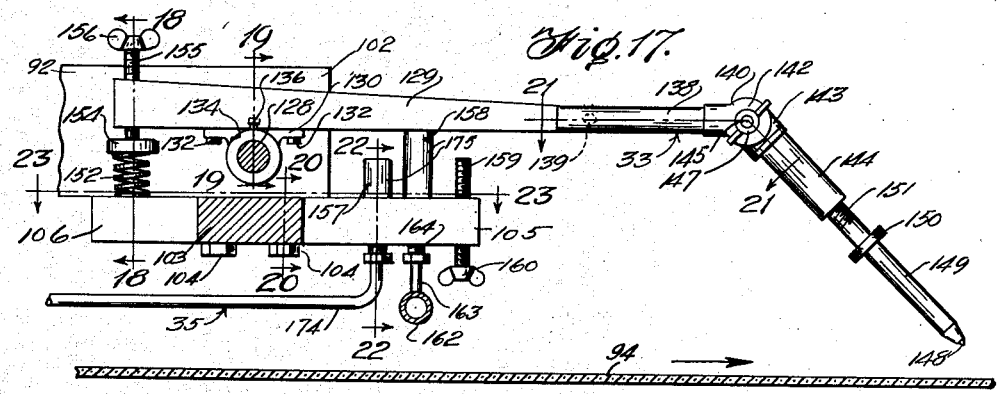
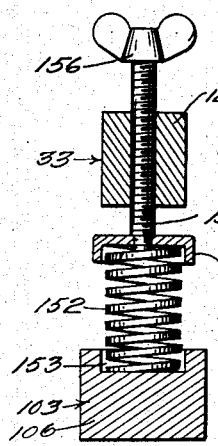
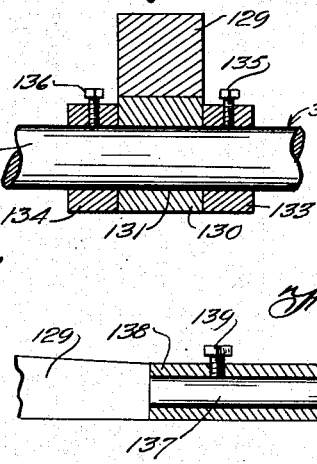
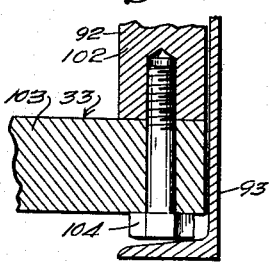
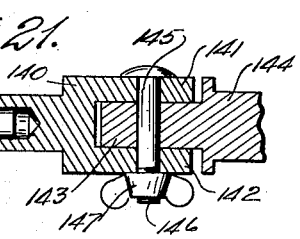
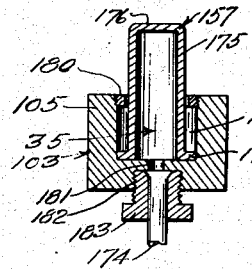
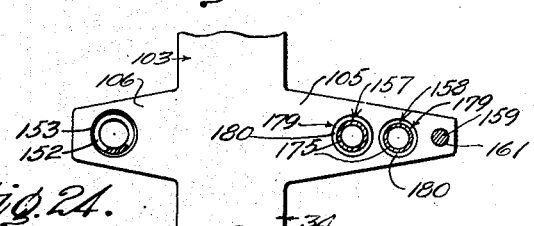
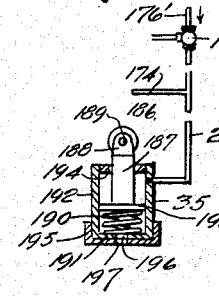
Inventor
LYDIA DIERICK GOFFAUX, ADMINISTRATRIX
OF THE ESTATE OF FELICIEN (FELIX)
GOFFAUX, DECEASED.
By Kimmel & Crowell
Attorneys.

Patented May 16, 1939

2,158,900

UNITED STATES PATENT OFFICE 2,158,900

MACHINE FOR CUTTING SHEET GLASS

Felicien (Felix) Goffaux, deceased, late of Shreveport, La., by Lydia Dierick Goffaux, administratrix, New York, N. Y.

Application December 31, 1937, Serial No. 182,882

19 Claims. (Cl. 49—48)

This invention relates to machines for providing a practical and efficient means for cutting sheets of glass or plate glass to commercial sizes rapidly and economically.

One object of this invention is to provide a sheet glass cutting machine. Another object is to provide a new and improved sheet glass cutting machine. A further object is to provide means for quickly and selectively cutting sheet glass to commercial sizes. Another object is to provide means for squaring the glass on the conveying means. Other objects include the provision of: means which will allow particles of glass or other foreign matter to fall through the conveyer; means for scoring the glass without stopping the conveyer; glass cutting means having a plurality of selectively controllable glass cutters; means for automatically removing all of the cutters from the machine; and means for automatically and selectively actuating the different cutters.

Yet further other objects include the provisions of: means for fracturing the sheet glass in cooperative relation with respect to the lines in which the glass has been scored; means for automatically fracturing the glass along the same relative lines that the glass has been scored; means for automatically operating the glass cutting means; an improved fracturing pin construction; an improved means for driving the conveyer; a readily adjustable means for automatically actuating the cutters; and means for selectively determining the fracturing pins that will be actuated.

Another object is to arrange a control means in such relation with respect to the conveyer so that the cutters for the sheets of glass may be quickly organized to eliminate defective portions of the glass sheet. Other objects and advantages of this invention will be ascertained from the following description when taken in connection with the accompanying drawings.

In the accompanying drawings, wherein like numerals indicate corresponding parts in the various figures, Fig. 1 is a side elevation of a glass cutting machine incorporating features of this invention and being partly broken away and partly shown in section. Fig. 2 is a transverse cross section on the line 2—2 in Fig. 1. Fig. 3 is a partial plan view partly broken away. Fig. 4 is a detail variation in the arrangement of the control means. Fig. 5 shows a detail variation in the power drive system. Fig. 6 shows a detail of the conveyer channel. Fig. 7 shows a detail variation in the hinge connection of the conveyer. Fig. 8 is an enlarged view partly in section showing a portion of a conveyer and a conveyer supporting channel.

Fig. 9 is a view on the line 9—9 in Fig. 8. Fig. 10 is a view showing the arrangement of the fracturing pin and corresponding to a transverse section on the line 10—10 of Fig. 12. Fig. 11 is another view of the fracturing pin mechanism taken at right angles to the view in Fig. 10. Fig. 12 is a partial plan view showing the portion of one of the conveyer members. Fig. 13 shows the sheet glass holding means. Fig. 14 is a cross section view on the line 14—14 in Fig. 13. Fig. 15 is an end view of one of the trip operating means attached thereto. Fig. 16 is an enlarged view taken at right angles to the view in Fig. 15. Fig. 17 is an enlarged detail showing the operating mechanism of the cutting device.

Fig. 18 is a cooperative section view on the line 18—18 in Fig. 17. Fig. 19 is a section on the line 19—19 in Fig. 17. Fig. 20 is a detail cross section on the line 20—20 in Fig. 17. Fig. 21 is a partial cross section on the line 21—21 in Fig. 17. Fig. 22 is a detail section of the selective operating mechanism corresponding to a section on the line 22—22 in Fig. 17. Fig. 23 corresponds to a plan view on the line 23—23 in Fig. 17. Fig. 24 is a detail variation showing an arrangement of the fracturing pin operating mechanism.

Considering the drawings in greater detail, the machine comprises essentially a conveyer 30 for transporting a sheet of glass from the front of the machine at 31 toward the rear thereof at 32, glass cutting means 33, glass fracturing mechanism 34, and control mechanism 35.

The mechanism is supported upon a suitable structural framework including structural steel side frames 36 and 37 tied together by transversely extending structural members 38. The framework additionally includes channels 39 and 40 which provide the necessary means for directing the conveyer in a definite path. The conveyer 30 comprises a series of narrow strips or slats 41 extending transversely across the conveyer, and having a plurality of spaced slats 42 having abutments 43 on the upper surfaces thereof. These abutments are arranged to have the edges of the glass sheets forced against them to maintain the sheet in definite position. The boss 44 tapers upwardly from the left hand edge 45 toward the right, so that the edge of a sheet of glass may pass readily over the abutment to be finally pressed securely against the face 43 thereby maintaining the glass in anchored alignment with respect to the length of the machine. These slats with the raised boss are positioned along the conveyer to provide a required length of conveyer for the sheet of glass which is to be cut.

The slats are interconnected by a plurality of hinges. Each hinge piece comprises a plate portion 46 having depending side arms 47 and 48 between which is mounted a roller 49, supported on a shaft 50 which latter is carried in the bearing openings 51. At the opposite ends of each plate is provided one or more bearing bosses 52 arranged to cooperate with complementary bosses 53 and 54 on the adjacent end of the next hinge plate. Each hinge is coupled by the pin 55 securing them together. Each hinge plate portion is secured to one of the slats. That portion of the slat to which the hinge plate is secured being squared, as at 109 in Figs. 8 and 9, so as to provide a flat surface upon which the bearing plate may be secured by the long bolts 110 fastened to the slats at the upper ends by the nuts 111. The hinges are interchangeable and the same type hinge is used at each side of the conveyer slats. Where the hinges are positioned at points inwardly from the ends of the slats the squared portions 109 will similarly be located at points away from the end of the slats. The rollers 49 of the hinges are arranged to ride in the channels 39 and 40. In order to direct the rollers into the proper channel, the channels are provided with guide channel portions 56 so that the rollers will always be directed into the channel and will always operate there in a definite space alignment. Each guide channel is arcuate as seen in Fig. 1 and is arranged with outwardly tapering channel walls 57 and 58 and the enlarged web or apron portion 59. It will be readily appreciated that two or more of the channel members 39 may be used and that where more than two channel members are used and also where the channel members are positioned well in from the ends of the slats, that under those circumstances the drums will be undercut sufficiently to allow the rollers to pass through the drum periphery. The rollers riding upon the apron will always be directed centrally so as to continue directly in the channel.

Although the hinges have been illustrated in some of the figures as being adjacent the ends of the slats it may be preferable to position the hinges at spaced points inwardly of the edge of the slats. In Fig. 7 the slat 41 is indicated as having a hinge 60 positioned well in from the edge 61. When the conveyer is constructed in this manner it will be readily understood that the channels 39 and 40 will be spaced a greater distance from the sides of the framework 36 and 37. The conveyer slats are not contiguous but are spaced a short distance apart so as to allow particles of glass, diamond, or other small particles of substances to fall through the conveyer instead of remaining on top of the same.

At each end of the conveyer is placed one or more drums 62 and 63 respectively, the former of which is a mere idler drum whereas the latter is the driving drum by which the conveyer is caused to move. The under side of each slat is curved as at 64 and the outer surfaces of each of these drums is peripherally corrugated in a manner to correspond to the shape of the drum engaging surface of the conveyer. The drum 62 is supported by the shaft 65 which latter is carried in the bearings 66 and 67 and secured to the side frame structure 68. This drum being the idler drum is free to rotate. The corrugations 69 in the outer surface of this drum are clearly visible in Fig. 2. The drum 63 at the opposite end of the conveyer system is carried upon the axle 70 supported in the bearing members 71 and 71' which is secured upon the structural frame 72, the latter being a part of the side frame structure 37.

The source of motive power for the driving drum is an electric motor 74 mounted upon the cross channel member 75 tying the opposite frame walls together. An intermediate shaft 76 is supported in bearings upon the side frames and is arranged to carry pulleys 77 and 78. Pulley 77 is directly driven by means of the belt or chain 79 operated from the pulley 80 on the motor shaft. The pulley 78 is secured to the shaft 76. It is arranged to drive the belt or chain member 81 which in turn drives a wheel 82 fixed to the shaft 70. This in turn drives the drum 63 which latter is shown as being in two parts 63 and 63'.

In Fig. 1 and 3 the driving drum is shown as being of the same construction as the idler drum 62. This is not the only way, however, that the conveyer may be driven and by reference to Fig. 5 it will be seen that the construction may be reorganized with a smaller diameter drive wheel 83 keyed to the shaft 70 as at 84. In this case the small diameter drive wheel 83 is positioned under that portion of the conveyer wherein the hinges pass so that the roller wheels 49 will ride in the grooves 85 at the same time that the rounded portion 64 of the slats ride in the grooves 86 in the outer surface of the drum 63.

A roller or a group of rollers 87 is preferably arranged to hold the conveyer against the drum as clearly indicated in Figs. 1 and 3. Such an arrangement will provide a positive drive between the drum and the conveyer.

When a sheet of glass 94 is placed upon the conveyer it will be forced against the abutment 43 by means of the spring rollers 88 three of which have been shown in Fig. 3. These rollers are mounted on lever arms 89 and keyed at 90 to the cross shaft 91. The latter is supported upon the blocks 92 one of which is located at each end of the shaft and arranged to slide on the structural member 93. The structural member 93 is provided with a plurality of holes 95 which are equally spaced so that the blocks can be secured to the framework by securing means 96. On the lower end of each of the arms 89 there is provided a yoke 97 carrying the roller 88 and arranged with an upper portion 98 arranged for limited relative movement with respect to the locating nut 99. A spring 100 is positioned between the substantially horizontally extending portion 101 of the arm 89 and the shoulder of the yoke. The spring yieldably urges the roller against the sheet of glass and in turn urges the sheet of glass against the abutment.

In each of the slats 41 is positioned a plurality of holes 107 in which are mounted fracturing pins 108 which are used to fracture the glass upon the line which has been scored by the cutters, to be hereinafter described. Although only a single slat has been indcated in Fig. 3 as having these holes it will be readily understood that all of the slats will preferably be provided with fracturing pins.

The fracturing pins more specifically may be composed of two parts. The upper part 112 being provided with a threaded stem 113 which latter is arranged to be screwed into the upper portion 114 of the stem of the lower part of the pin. The bottom 115 of the fracturing pin is arranged to be actuated by means to be described and in turn imparts its motion to the head 112 which strikes the sheet of glass thereby fracturing it along the score line. At each place in the slat in which the fracturing pins are located a hole is provided. This hole 107 may have a central portion 116 which is substantially circular in section and have laterally extending portions 117 and 118 which prevent the pin from turning after having been adjusted. The hole extends completely through the slat having a lower portion 119 of reduced diameter through which the lower portion of the stem 115 extends and an intermediate portion 120 in which is placed a cup member. The cup member 121 sets against the bottom 122 of the central portion and is retained therein by a cap 123 having a central opening 124 through which the stem 113 extends. Between the lower end 115, and the upper end 114 of the lower part of the fracturing pin is located the annular flange 125 which abuts against the bottom of the cup at one end of its movement and which is retained in that position by means of the spring 126 which abuts against the flange at one end and the cap 123 at the other end. The cap may be secured in place by wood screws 127.

The fracturing pins may be adjusted by pushing upon the lower portion 115 and raising the pin to such an extent that the head 112 will be extended above the walls of the holes 107. In such position the head may be rotated or screwed in or out of the lower part of the pin. After the pin has been properly adjusted it may again be released so that the spring will force it downwardly in the hole. If the head portion is screwed down to such an extent that it does not allow the lower end 115 to extend below the conveyer, the fracturing pins will not be operated because they will be unable to strike against the actuating mechanism which is hereinafter described. When the lower end 115 is allowed to extend below the conveyer it can then strike against the actuating means and effectively fracture the glass.

At each side of the machine is mounted a channel member 93. Into each of these channel members is secured a block 102 and to the bottom of each block is secured by means of the bolts 104 the transversely extending cross member 103. The latter extends from one side of the cutter machine to the other and is provided with a plurality of oppositely extending projections 105 and 106 the individual projections being directly opposite respective individual projections on the other side of the member and each set of projections forming a block extending in the general direction of movement of the conveyor. The center line of each block is arranged parallel to the guides 93. The cross member is normally stationary and the extending portions 105 and 106 are provided with mechanism for controlling the operation of the cutters.

A rod 128 extends transversely of the machine above the cross member 103 and is secured at each end to either the blocks 102 or the frame 93. Upon the rod 128 is pivotally mounted a plurality of cutting tool supports 129. Although only a few of these members have been illustrated in Fig. 3 the actual machine will preferably contain in the neighborhood of about 100 of these actual cutters extending transversely of the machine and so organized as to be susceptible of cutting the sheet glass into an infinite combination of dimensions. The cutting tool support has secured upon its bottom surface a carrying member 130 which contains a central opening 131 through which the shaft 128 extends and which is secured to the cutting tool support by the fastening means 132. The cutting tool support is mounted upon the shaft in such a manner as to provide a limited axial movement. In order to accomplish this, the member 130 is retained at a definite location on shaft 128 by means of collars 133 and 134, positioned at either side thereof and secured to the shaft by the set screws 135 and 136. The cutting tool support as described may freely oscillate upon the shaft 128.

The outer end of the cutting tool support 129 is rounded and is of reduced section as at 137 so that the cutting tool holder 138 may be fastened thereupon by the set screw 139.

The cutting tool comprises the holder portion 138 which is arranged to extend about the reduced section 137. The holder 138 at its outer end has a bifurcated portion 140 the legs 141 and 142 of which extend at either side of the head 143 of the cutting tool holding sleeve 144. The two parts are relatively movable with respect to each other about the pivot pin 145 which is threaded at its outer end 146 and upon which is located a wing nut 147 which fastens the parts in a definite position. A removable cutting element such as a diamond 148 is mounted in a stem 149 carrying a knurled flange 150. The upper end of the stem is threaded at 151 and is arranged to be screwed into the sleeve 144.

Each cutting tool is normally urged toward the sheet of glass 94 by means of the spring 152. The spring is seated at one end in a recess 153 in the cutter block portion 106 and has its opposite end seated in a cup 154 rotatably secured at the lower end of the adjusting screw 155. The screw is carried at the left hand end of the cutting tool support 129. The upper end of the screw is provided with a wing nut 156 by means of which the spring is adjustable. The adjustment of this screw controls the degree of compression of the spring 152 and in turn controls the application of force which is applied to the cutting tool 148 upon the glass.

At the opposite side of the fulcrum 128 of each cutting block is located the operating elements 157, 158 and 159.

The element 159 is a limit stop in the form of a long threaded screw having a wing nut style head 160 at its lower end. This screw is threaded through a threaded opening 161 in the extension 105 and by means of its adjustment the approach movement of the cutter 148 toward the conveyor is limited. By this adjustment the cutting tool can be arranged so that it will never score the upper surface of the conveyor. A yieldable material may be placed upon the surface 43 to absorb any irregularities in the edge of the glass sheet.

The elements 158 are air actuated pistons all of which are actuated at the same time to raise all of the cutters from the sheet of glass or to release all of the cutters and allow them to be placed upon the sheet of glass. These cylinders are simultaneously operated from a single air line 162 which extends from the panel 35 along the side of the machine and across under all of the cutter blocks with individual air pipes 163 coupled at 164 to each cylinder holding a piston 158. The pistons 158 will be similar in construction to the pistons 157 hereinafter described.

Interposed in this air line at the right of the air supply portion 162' thereof, is a trip valve 165 having an actuating arm 166 which latter is held in one position by spring 168 secured upon a portion of the frame 169. This valve is a three-way valve arranged to exhaust all of the pistons 158 to the air pressure in another position.

This valve hereinafter called a trip valve is arranged to be actuated by blocks 167 secured at one extremity of certain of the slats and so located with respect to the bosses 42 that all of the cutters engaging the surface of the glass sheet will be raised from the work as the boss passes under the cutters and will then be allowed to drop upon the next sheet of glass being carried on the conveyer.

Each trip valve lever actuating block 167 may have downwardly extending flanges 170 and 171 arranged to extend on each side of a slat and be secured thereto by a pin 172. The blocks will be secured upon the slats as they pass about one of the drums so that the pins may be readily placed through the blocks and the conveyer. Another simple arrangement which can be utilized in this connection, especially where the hinges are positioned inwardly from the ends of the slats, is to provide each block with a band that will fit snugly around the slat of the conveyer and hold the block in place.

Means 157 is operated under the control of an individual valve 173 mounted on the control panel 35. An air line 174 extends from the valve on the panel to piston 157. The air supply is indicated at 175' with two air lines 176' and 177' going to the panel. These air lines will be under the control of master valves 198 and 199 and one of the air lines may go directly to the pipe 162' whereas the other one will be the supply pipe for all of the valves 173. These individual air pipes have been indicated as extending out over the conveyer in Fig. 3 for the purpose of clearly illustrating the invention, the preferred arrangement of the parts however locates these air lines along the side of the machine. They then extend across the conveyer in the immediate vicinity of the cross member 103. It is equally contemplated within the scope of this invention that the air lines and control panel be divided with a number of the valves on one side of the machine and the others directly opposite on the other side of the machine. A variation of this arrangement may contemplate locating the valves at the end of the conveyer upon a shelf 35' with the valves 173' positioned in space transversely along the width of the conveyer. In this arrangement the pipes 174 will preferably extend along the side of the conveyer as indicated. In Fig. 4 the valves 173' are more readily operated for the reason that the valves are directly aligned with respect to the location of the respective cutter tools whereas the arrangement of Fig. 1 requires indicia marks corresponding to the cutters. The valves 173 when in the open position are so constructed as to place the interior of the pistons 157 in communication with the atmosphere. When they are in their closed position the pistons are placed in direct communication with the air supply thereby causing the respective pistons 157 to raise and lift its cutter from the work. When it is desired to allow a particular cutter to be lowered upon the work, the valves 173 are moved to open position.

The devices 157 and 158 can preferably be arranged in the form of inverted cups 175 having a closed end 176 the latter having a radially extending annular flange 178. These cups are arranged to fit within holes 179 cut into the portion 105 of each cutter block. The upper end of the hole is partly closed by a threaded collar or washer 180 which retains the piston in place and engages the flange 178 when the piston moves outwardly in response to air pressure. The fit between the piston and the collar is such as to avoid locking of air between the outside of the piston and its cylinder. The hole 179 has a counterbore 181 extending from the bottom thereof into a threaded enlarged bore 182. The air line 174 of flexible tubing such as copper tubing is secured to the opening 181 by means of the hollow coupling nut 183. The device 158 is similarly arranged.

It can now be readily understood that by setting the valve 173 or 173' in the open position the particular valves which have been selected will open their respective thimble pistons 157 to the atmosphere so that the said pistons will drop by gravity in their cylinders. The respective cutters pivotally mounted above these pistons are then arranged so that they may engage a sheet of glass. When the sheet of glass moves along the conveyer and one of the limit stops 167 engages the valve arm 166 all of the thimble valves 158 will be actuated to allow the cutters to be raised from the sheet of glass. Only those cutters will engage the sheet of glass however that have been previously selected and which have had their piston devices 157 lowered. The downward movement of the cutters will then be restricted solely by the limit stops 159. It will of course be understood that these devices may be arranged to operate in the reverse manner although the operation as just described is that which is preferred.

For the purpose of operating the fracturing pins as heretofore described, a roll 184 is mounted transversely of the conveyer and below the same upon bearings secured to the frame members 185. As the slats 41 move over the roller 184 the fracturing pins 115 sharply engage the roller 184 and in their upward movement strike the sheet of glass breaking it along the score which has been previously made. The manner of adjusting the fracturing pins as heretofore described necessitates stopping the conveyer mechanism during the time the adjustment is made. To avoid such a condition and facilitate quicker control of the machine a slight variation can be made in the mechanism 184. This has been illustrated diagrammatically in Fig. 24 wherein the roll 184 has been broken down into a plurality of individual rolls 186 each one of which is arranged to be positioned under the work carrying strand of the conveyer in line with a particular series of fracturing pins.

Each roll is mounted upon the upper surface of the thimble valve or piston 187 supported between bifurcated arms 188 by the pin 189. This roller is held in its uppermost position by means of a spring 190 positioned between the bottom 191 of the cylinder 192 and the bottom flange 193 of the cup. The upper end of the cylinder may be closed by a cylinder head 194 threaded into the open end thereof. The series of cylinders 192 are mounted upon a cross channel 195 comprising a part of the framework and each cylinder has the interior portion thereof, containing the spring, open to the atmosphere by means of the aligned openings 196 and 197 in the channel and cylinder respectively. The air line 176' goes to the hand operated selector valve 173'' which latter is normally closed. That is, the valve is in position to allow air pressure to enter both the selected devices 157, which control the cutters, thereby holding the cutters in raised position, and also by way of pipe 200 to effect the lowering of the roller 186 out of actuating position with regard to the fracturing pins. When it is desired to operate a particular cutter its valve 173" is moved to open position, that is, the position allowing the interior of the piston 157 and the upper portion of the cylinder 192 to be connected with the atmosphere thereby exhausting both devices, and allowing the spring in the cylinder 192 to raise the roller 196, and gravity to lower the piston 157. In this manner the cutter is lowered upon the sheet of glass and the roller is raised to actuate the fracturing pins which are in alignment with the score made by the particular cutter.

The driving drum 63 as well as the idler drum 62 may be provided with a plurality of peripherally extending grooves or slots 201, 202, 203 etc. on the driving drum and grooves 204, 205, 206, etc., on the idler drum.

A shelf may be placed at the leading or front end 31 of the conveyer. It will be raised a slight distance above the level of the conveyer so that the glass sheet can easily slide over the bosses onto the conveyer. A shelf may also be placed at the trailing or rear end, at a level slightly below that of the conveyer so that the sheet can easily pass off of the conveyer onto the shelf.

In the operation of this machine, the sheets of glass to be cut are fed to the receiving end 31 of the conveyer by suitable means (not shown) so that the sheet will be flat upon the slats 41. The trailing or rear edge of the sheet 94 will be engaged by the abutments 43 carried by the slats 42, and the glass then will be moved with the conveyer. In the event the trailing or rear edge of the glass 94 does not initially engage the abutments 43 the spring pressed rollers 88 will hold the glass 94 against movement until the abutments 43 contact with the trailing edge, and thereafter the rollers 88 will ride over the upper surface of the glass 94 and hold the glass flat upon the slats 41.

At this time the plungers 158 are in released position and at the same time selected valves 173 are opened so as to raise selected plungers 157 and hold selected levers 33 with the cutters 148 carried thereby in disengaged position. The remaining levers 33 will be urged to operative position by their springs 152 so that the cutters 148 carried by the remaining levers 33 will contact with the sheet of glass as the sheet moves thereneath. The glass will be scored by such ones of the cutters 148 as are in operative position and when the slats 41 pass over the fracture operating roll or member 184 the tappers or fracturing members 108 will be raised in sequence so as to tap the underside of the sheet 94 directly below the scored portion thereof. The fracture operating roll 184 is positioned forwardly of the cutters 148 a distance sufficient that the fracturing or tapping operation will not start until a fairly long score has been made in the upper surface of the glass.

When selected valves 173 are operated to lower the associated cutters 148 the spring-pressed rollers 184 associated with the selected cutters 148 will be raised to operative position by the springs 190, and such of the cutters 148 as are raised will have their associated fracture operating rollers 184 lowered to inoperative position by the fluid forcing the plunger 193 downwardly against the tension of the spring 190. In this manner the tapping of the glass will only occur along the score lines formed by the cutters 148.

The scored and fractured glass is then delivered to a suitable receiving means at the delivery end 32 of the conveyer.

Although the invention has been shown and described in connection with a preferred embodiment thereof, variations within the true spirit and scope of the same are to be determined by the appended claims.

What is claimed is:

1. In sheet glass cutting apparatus an endless conveyer having a plurality of parallel slats forming a cutting table, a plurality of glass scoring cutters associated with said table and positioned above the same, means including a plurality of fracturing pins mounted in each slat for breaking the glass along the score made by said cutters, means beneath the glass carrying strand of the conveyer for actuating said pins, means for driving said conveyer including a drum having a plurality of surface corrugations for receiving said slats, hinge means having rollers holding said slats together, and an auxiliary drum having a corrugated periphery arranged to receive said rollers in driving relation.

2. In a glass cutting aparatus a conveyer for carrying a sheet of glass, a cutter above the conveyer for scoring the glass, variably adjustable yielding means urging the cutter toward the conveyer, an adjustable limit stop for determining the degree to which the cutter may approach the conveyer, manual means for selectively allowing the cutter to approach the conveyer, glass fracturing pins carried by said conveyer, rolls beneath the upper strand of the conveyer for actuating the pins, fluid cylinders for raising the rolls to effective position, said manual means controlling said fluid operated cylinders.

3. In sheet glass cutting apparatus a frame, an endless conveyer carried by said frame forming a cutting table, a plurality of glass scoring cutters associated with said table and positioned above the same, means carried partly by said frame and partly by said conveyer for breaking the glass along the score made by said cutters, and a control board having means for selectively holding certain of said cutters in operative position while simultaneously holding the breaking means associated with said selected cutters in inoperative position.

4. In sheet glass cutting apparatus a frame, an endless conveyer carried by said frame forming a cutting table, a plurality of glass scoring cutters associated with said table and positioned above the same, means carried partly by said frame and partly by said conveyer for breaking the glass along the score made by said cutters, a control board having means for selectively holding certain of said cutters and their associated breaking means in inoperative position, and said conveyer being so arranged that foreign matter will be released through the glass bearing strand thereof.

5. In sheet glass cutting apparatus a frame, an endless conveyer carried by said frame forming a cutting table, a plurality of glass scoring cutters associated with said table and positioned above the same, means carried partly by said frame and partly by said conveyer for breaking the glass along the score made by said cutters, and a control board having means for selectively actuating said cutters and said breaking means by compressed air, and means on said conveyer for holding said glass square with the apparatus and for retaining it in said position.

6. In sheet glass cutting apparatus an endless conveyer forming a cutting table, a plurality of glass scoring cutters associated with said table and positioned above the same, means for breaking the glass along the score made by said cutters, a control board having means for selectively actuating said cutters by means of compressed air, and means for selectively setting the breaking means to be effective under any score.

7. In sheet glass cutting apparatus an endless conveyer forming a cutting table, a plurality of glass scoring cutters associated with said table and positioned above the same, means for breaking the glass along the score made by said cutters, and a control board having means for selectively actuating said cutters and said breaking means by compressed air.

8. In sheet glass cutting apparatus a frame, an endless conveyer carried by said frame forming a cutting table, a plurality of glass scoring cutters associated with said table and positioned above the same, means carried partly by said frame and partly by said conveyer for breaking the glass along the score made by said cutters, a control board having means for selectively actuating said cutters and said breaking means by compressed air, and means carried by said conveyer for holding said glass square with said conveyer.

9. In sheet glass cutting apparatus an endless conveyer forming a cutting table, a plurality of glass scoring cutters associated with said table and positioned above the same, means for breaking the glass along the score made by said cutters, and a control board having means for selectively actuating said cutters and said breaking means by compressed air, and master means for automatically raising all of the cutters.

10. In sheet glass cutting apparatus an endless conveyer having a plurality of parallel slats forming a cutting table, a plurality of glass scoring cutters associated with said table and positioned above the same, means including a plurality of fracturing pins mounted in each slat for breaking the glass along the score made by said cutters, means beneath the glass carrying strand of the conveyer for actuating said pins, and means connected to said cutters and said pin actuating means whereby selected cutters and their associated pin actuating means may be held in inoperative position.

11. In sheet glass cutting apparatus an endless conveyer having a plurality of parallel slats forming a cutting table, glass scoring cutters associated with said table and positioned above the same, means including fracturing pins mounted in each slat for breaking the glass along the score made by said cutters, means beneath the conveyer for actuating said pins, means for driving said conveyer including a drum having a plurality of surface corrugations for receiving said slats, and means connected to said cutters and said pin actuating means whereby selected cutters and their associated pin actuating means may be held in inoperative position.

12. In sheet glass cutting apparatus an endless conveyer forming a cutting table, a plurality of glass scoring cutters associated with said table and positioned above the same, means including a plurality of fracturing pins carried by said conveyer for breaking the glass along the score made by said cutters, means beneath the glass carrying strand of the conveyer for actuating said pins, means for selectively determining those portions of said last named means which are effective and means connected to said cutters and said pin actuating means whereby selected cutters and their associated pin actuating means may be held in inoperative position.

13. In a glass cutting apparatus a conveyer for carrying a sheet of glass, a frame having side structure supporting said conveyer, a bar extending transversely across said conveyer and between said structures, said bar having a plurality of extensions on each side thereof with the extensions disposed on one side being aligned with those disposed on the other side to thereby jointly form a cutter block, a shaft above said bar, a plurality of cutter holders pivotally mounted upon said shaft, springs at one side of said shaft extending between each of said holders and one of said cutter blocks, and pneumatic means in each of said blocks on the other side of said shaft arranged to allow said cutter holders to selectively approach the conveyer or collectively recede from the conveyer.

14. In a sheet glass cutting apparatus, a frame, an endless conveyer in said frame, a plurality of glass scoring members carried by said frame for scoring a sheet of glass disposed on said conveyer, means holding selected ones of said scoring members in inoperative position, means carried by said conveyer for fracturing the glass along the scored portions thereof, operating means for said latter means carried by said frame, and means holding selected ones of said fracturing members in inoperative position.

15. In a sheet glass cutting apparatus, a frame, an endless conveyer in said frame, a plurality of glass scoring members carried by said frame for scoring a sheet of glass disposed on said conveyer, means holding selected ones of said scoring members in inoperative position, means carried by said conveyer for fracturing the glass along the scored portions thereof, stationary operating means carried by said frame for said latter means, and means holding selected ones of said fracturing members in inoperative position.

16. In a sheet glass cutting apparatus, a frame, an endless conveyer in said frame, a plurality of glass scoring members carried by said frame for scoring a sheet of glass disposed on said conveyer, means holding selected ones of said scoring members in inoperative position, a plurality of spring-pressed fracturing pins carried by said conveyer, each pin having a portion thereof projecting in the direction of the opposite run of the conveyer, means disposed in the path of said pins for moving said pins to operative position, and means holding selected ones of said fracturing members in inoperative position.

17. In a sheet glass cutting apparatus, a frame, an endless conveyer carried by said frame, transversely extending abutments carried by said conveyer for engagement with an edge of the glass, cutters carried by said frame above the conveyer, and means carried by said frame above said conveyer and in advance of said cutters for holding the glass against said abutments.

18. In a sheet glass cutting apparatus, a frame, an endless conveyer carried by said frame, transversely extending abutments carried by said conveyer for engagement with an edge of the glass, cutters carried by said frame above the conveyer, and spring-pressed rollers carried by said frame above said conveyer and in advance of said cutters for holding the glass against said abutments.

19. In a sheet glass cutting apparatus, a frame, an endless conveyer carried by said frame, transversely extending abutments carried by said conveyer for engagement with an edge of the glass, cutters carried by said frame above the conveyer, a plurality of rollers disposed in advance of said cutters, rock arms carried by said frame for said rollers, and means yieldably securing said rollers to said rock arms whereby said rollers will yieldably engage the sheet of glass and maintain said edge of the glass against said abutments.

LYDIA DIERICK GOFFAUX,
*Administratrix of the Estate of Felicien (Felix) Goffaux, Deceased.*